(12) United States Patent
Drewry et al.

(10) Patent No.: US 9,015,824 B1
(45) Date of Patent: Apr. 21, 2015

(54) ALLOWING A CLIENT COMPUTING DEVICE TO SECURELY INTERACT WITH A PRIVATE NETWORK

(75) Inventors: William A. Drewry, Nashville, TN (US); Kenneth Edward Mixter, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 13/405,167

(22) Filed: Feb. 24, 2012

Related U.S. Application Data

(60) Provisional application No. 61/590,776, filed on Jan. 25, 2012.

(51) Int. Cl.
  *H04L 29/00* (2006.01)
  *H04L 9/32* (2006.01)
  *G06F 11/30* (2006.01)

(52) U.S. Cl.
  CPC . *H04L 9/32* (2013.01); *G06F 11/30* (2013.01)

(58) Field of Classification Search
  CPC .......... G06F 11/30; G06F 15/173; H04L 9/32
  See application file for complete search history.

(56) References Cited

U.S. PATENT DOCUMENTS

| | | | |
|---|---|---|---|
| 7,272,723 B1 * | 9/2007 | Abbott et al. | 713/185 |
| 2012/0233674 A1 * | 9/2012 | Gladstone et al. | 726/6 |

OTHER PUBLICATIONS

Andreas Wespi, Giovani Vigna, Luca Deri /Recent Advances in Intrusion Detection/ Oct. 2002/ Springer/ pp. 1-325.*

* cited by examiner

*Primary Examiner* — Brandon Hoffman
*Assistant Examiner* — Michael D Anderson
(74) *Attorney, Agent, or Firm* — McDermott Will & Emery LLP

(57) ABSTRACT

Systems and methods for allowing client computing device to securely interact with private network are provided. Method includes initiating virtual private network connection. Method also includes executing at least portion of virtual private network client code within memory region for unsecure software. Method also includes receiving request within virtual private network client code to access local resource. Local resource is within memory region for secure software. Method also includes determining whether virtual private network client code has permission to access local resource within memory region for secure software. Method also includes, if virtual private network client code has permission to access local resource, providing local resource to virtual private network client code according to request within virtual private network client code. Method also includes, if virtual private network lacks permission to access the local resource, denying local resource to virtual private network client code.

33 Claims, 3 Drawing Sheets

US 9,015,824 B1

ALLOWING A CLIENT COMPUTING DEVICE TO SECURELY INTERACT WITH A PRIVATE NETWORK

This application claims priority under 35 U.S.C. §119(e) and the benefit of U.S. Provisional Application No. 61/590,776, filed Jan. 25, 2012, the entire disclosure of which is incorporated herein by reference.

FIELD

The subject technology generally relates to virtual private networks, in particular, relates to allowing a client computing device to run untrusted code associated with connecting with a private network in a secure manner.

BACKGROUND

Private networks, e.g., private networks accessed via virtual private network software, are ubiquitous to business persons, students, and others because private networks allow end-users to interact with a set of shared software resources, such as data or instructions, located on a remote server. In a typical implementation, a private network communicates with a client computing device over the Internet. The private network bypasses traditional Internet security features, such as firewalls, by "tunneling" directly into the private network. As a result, the private network may transmit data to the client computing device. However, the client software for the private network may install additional, possibly unsecure software on the client computing device, presenting a security risk to the client computing device and compelling the end-user to lose exclusive control over the client computing device. As the foregoing illustrates, an approach to allowing a client computing device to securely interact with a private network may be desirable.

SUMMARY

The disclosed subject matter relates to a computer-implemented method allowing a computing device to securely interact with a private network. The method includes initiating a virtual private network connection. The method also includes executing at least a portion of a virtual private network client code within a memory region for unsecure software. The method also includes receiving a request within the virtual private network client code to access a local resource. The local resource is within a memory region for secure software. The method also includes determining whether the virtual private network client code has permission to access the local resource within the memory region for secure software. The method also includes, if the virtual private network client code has permission to access the local resource, providing the local resource to the virtual private network client code according to the request within the virtual private network client code. The method also includes, if the virtual private network lacks permission to access the local resource, denying the local resource to the virtual private network client code.

The disclosed subject matter further relates to a computer-readable medium. The computer-readable medium includes instructions that, when executed by a computer, cause the computer to implement a method for allowing a computing device to securely interact with a private network. The instructions include code for receiving a request from virtual private network client code to access a local resource within a memory region for secure software. The instructions also include code for determining whether the virtual private network client code has permission to access the local resource within the memory region for secure software. The instructions also include code for, if the virtual private network client code has permission to access the local resource, providing the local resource to the virtual private network client code according to the request. The instructions also include code for, if the virtual private network client code lacks permission to access the local resource, denying the local resource to the virtual private network client code.

The disclosed subject matter further relates to a system. The system includes a fault-isolated, sandboxed virtual private network software region within a memory region for unsecure software. The fault-isolated, sandboxed virtual private network software region is configured to execute at least a portion of a virtual private network client code. The system also includes a virtual private network broker module within a memory region for secure software. The virtual private network broker module is configured to receive a request within the virtual private network client code to access a local resource. The local resource is within the memory region for secure software. The virtual private network broker module is also configured to determine whether the virtual private network client code has permission to access the local resource within the memory region for secure software. The virtual private network broker module is also configured to, if the virtual private network client code has permission to access the local resource, provide the local resource to the virtual private network client code according to the request within the virtual private network client code. The virtual private network client code is also configured to, if the virtual private network client code lacks permission to access the local resource, deny the local resource to the virtual private network client code.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The features of the subject technology are set forth in the appended claims. However, for purpose of explanation, several aspects of the disclosed subject matter are set forth in the following figures.

DETAILED DESCRIPTION

Figure 1:
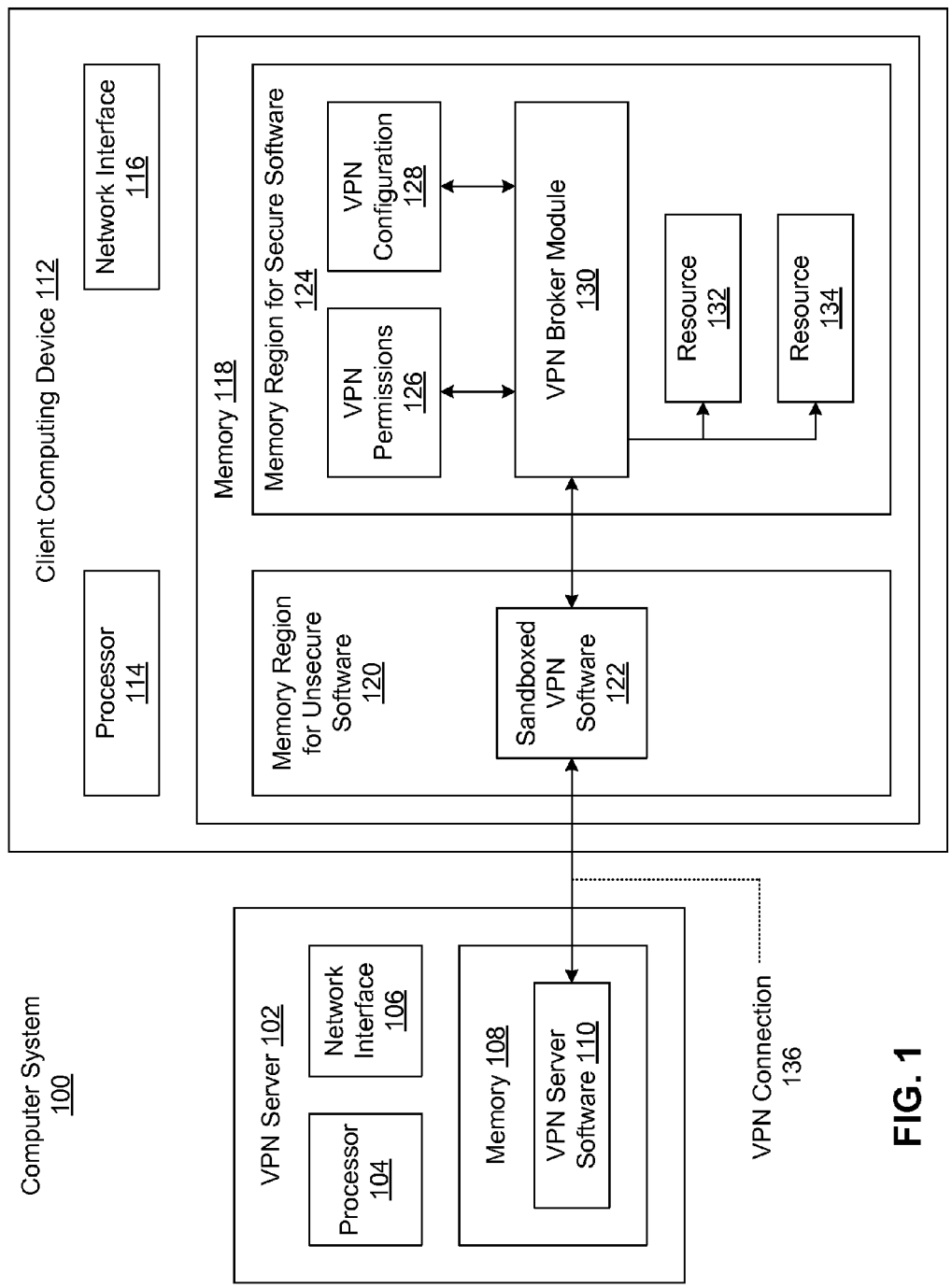
FIG. 1 illustrates an example of a computer system configured to implement allowing a client computing device to securely interact with a private network.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject technology is related to allowing a computing device to securely interact with a private network. The client computing device may receive or update virtual private network client code, to be stored on the client computing device, either when a virtual private network connection is initiated or independently of when the virtual private network connection is initiated. The client computing device may initiate a virtual private network connection with a private network associated with the virtual private network client code. The client computing device may execute at least a portion of the virtual private network client code within a memory region for unsecure software of the client computing device, for example, a sandboxed virtual private network software region. The sandboxed virtual private network software region may be fault isolated, i.e., the virtual private network client code may be able to execute without modifying any resources external to the memory region for unsecure software. The sandboxed virtual private network software region may be a web platform. The virtual private network client code may include both high-level language code and low-level code, for example, native code. The client computing device may receive a request within the virtual private network client code to access a local resource. The local resource may reside within a memory region for secure software external to the memory region for unsecure software. Example local resources may include one or more of a network packet tunnel from a kernel capable of receiving and sending packets to a restricted set of Internet Protocol (IP) addresses, an ability to receive network configuration information from an administrator, access to a certificate encryption or authentication module, or an ability to set domain name servers. The client computing device may determine whether the virtual private network client code has permission to access the local resource within the memory region for secure software. The determination whether the virtual private network client code has permission to access the local resource within the memory region for secure software may be based on input from a user of the client computing device or virtual private network permissions data or virtual private network configuration data stored on the client computing device. If the virtual private network client code has permission to access the local resource, the client computing device may provide the local resource to the virtual private network client code according to the request within the virtual private network client code, for example, via a remote procedure call or an application programming interface. If the virtual private network client code lacks permission to access the local resource, the client computing device may deny the local resource to the virtual private network client code and transmit an error message to the virtual private network client code. The term "virtual private network client code" may refer to software that runs on a client computing device that creates a connection between the client computing device and some locked down private network via an untrusted public network, e.g., the Internet.

Advantageously, the subject technology provides a virtual private network sandbox within which virtual private network client code may run on a client computing device. As a result, secure portions of the memory or hardware of the client computing device, external to the virtual private network sandbox, may be safe from malicious virtual private network client code.

FIG. 1 illustrates an example of a computer system 100 configured to implement allowing a client computing device to securely interact with a private network.

As shown, the computer system 100 includes a virtual private network (VPN) server 102 and a client computing device 112. While only one VPN server 102 and one client computing device 112 are illustrated, the subject technology may be implemented in conjunction with multiple VPN servers or multiple client computing devices.

As shown, the VPN server 102 includes a processor 104, a network interface 106, and a memory 108. The processor 104 is configured to execute computer instructions that are stored in a computer-readable medium, such as the memory 108. For example, the processor 104 may include a central processing unit (CPU). The network interface 106 is configured to allow the VPN server 102 to transmit and receive data in the network. The network interface 106 may include one or more network interface cards (NICs). The memory 108 stores data and instructions. As illustrated, the memory 108 stores VPN server software 110.

The VPN server software 110 includes software or hardware machine instructions that, when executed, cause the VPN server 102, upon receiving a request from a remote computing device to connect to a private network, to create a VPN connection, e.g., a tunnel, between a network associated with the remote computing device and a network associated with the VPN server 102. The VPN server software 110 may be configured to "tunnel" into a private network associated with a remote computing device or to provide software which may execute within a VPN client sandbox in a memory region for unsecure software of the remote computing device. For example, the VPN server software 110 may tunnel into a private network via the VPN connection 136. The VPN connection 136 may be an IP tunnel. The VPN client sandbox may correspond to a security mechanism where software associated with the private network may execute within a set of resources provided within the sandbox. Software associated with the private network, e.g., VPN client code, executing within a VPN client sandbox may be referred to as sandboxed VPN software. The VPN client code may include software associated with a private network that is configured to run on a client computing device, e.g., client computing device 112. In one implementation, the VPN client code may, by default, lack permissions to access resources outside the VPN client sandbox, for example, resources within a memory region for secure software outside the VPN client sandbox. In addition, the private network may include shared resources, for example, software programs, hardware resources, or data files.

The client computing device 112 may be any computing device that is capable of creating a VPN connection or interacting with a private network. The client computing device 112 may be a laptop computer, a desktop computer, a mobile phone, a personal digital assistant (PDA), a tablet computer, a netbook, etc. Persons skilled in the art will recognize other devices that could implement the functionalities of the client computing device 112. The client computing device 112 may include one or more of a keyboard, a mouse, a touch screen, or a display to allow a user to interact with the client computing device 112.

As shown, the client computing device 112 includes a processor 114, a network interface 116, and a memory 118. The processor 114 is configured to execute computer instructions that are stored in a computer-readable medium, such as the memory 118. For example, the processor 114 may include a central processing unit (CPU). The network interface 116 is configured to allow the client computing device 112 to transmit and receive data in the network. The network interface 116 may include one or more network interface cards (NICs). The memory 118 stores data and instructions. As illustrated, the memory 118 includes a memory region for unsecure software 120 and a memory region for secure software 124.

The memory region for unsecure software 120 may be configured to execute software instructions from physical or virtual machines or to run native or non-native code. Native code may include software code that is configured to be compiled and executed by a specific processor model, for example a processor model associated with the processor 114 of the client computing device 112. Native code may be configured to execute in a non-virtualized system, i.e., on a physical machine and not on a virtual machine. The memory region for unsecure software 120 may include resources that are accessible to software code associated with sources external to the client computing device 112, for example, software code within a VPN, including VPN client code.

The memory region for unsecure software 120 may include sandboxed VPN software 122. The sandboxed VPN software 122 may be configured to execute at least a portion of the VPN client code associated with a private network (e.g., the private network associated with VPN server software 110 in VPN server 102). In one implementation, the sandboxed VPN software 122 is the VPN client code. The sandboxed VPN software 124 may communicate with the VPN server software 110 via an VPN connection 136. The sandboxed VPN software 122 may implement fault isolation. Fault isolation may refer to the sandboxed VPN software 122 being able to execute without modifying any resources that are external to the memory region for unsecure software 120 or are not provided to the VPN by a VPN client sandbox or a VPN broker module (e.g., VPN broker module 130). In one implementation, the sandboxed VPN software 122 may not access any resources external to the memory region for unsecure software 120. The fault isolation of the sandboxed VPN software 122 may be enforced via software or via hardware. If the fault isolation of the sandboxed VPN software 122 is enforced via software, the software may reside within the memory region for secure software 124 or the memory region for unsecure software 120. The fault isolated, sandboxed VPN software region 124 may be a web platform. The VPN client code executing on the web platform may include both high-level language code and low-level code. The high-level language code may include, for example, JavaScript code or HTML5 code. The low-level code may include native code or low-level portable virtual machine code.

The VPN client code may be downloaded to the fault-isolated, sandboxed VPN software region 122 via a web protocol, e.g., HTTP or HTTPS. The VPN client code may be written via a web application programming interface (API), e.g., JavaScript, HTML, or CSS. All or a portion of the VPN client code may be implemented using an HTML5 web platform within the fault-isolated, sandboxed VPN software region 122. The HTML5 web platform may include at least one extension configured to interact with the VPN broker module 130, which the VPN client code may use. The VPN broker module 130 is described in detail below.

The memory region for secure software 124 may be configured to execute native code and to verify that any machine instructions or software code executing within the memory region for secure software 124 or accessing resources within the memory region for secure software 124 have permission to execute the code or access the resources. The permission may be affirmative permission, where affirmative permission refers to an affirmative statement, rather than a passive or default, by a user or by a module stored in the memory region for secure software 124 that the code may execute or the resources may be accessed. In one implementation, permission for code to execute may be granted by prompting a user for permission to execute code or access resources 132 or 134 within the memory region for secure software 124 and receiving, from the user, an indication whether the permission is granted. The prompting the user may be accomplished, for example, via a window on a display. As shown, the memory region for secure software 124 includes VPN permissions data 126, VPN configuration data 128, a VPN broker module 130, and resources 132 and 134.

The VPN permissions data 126 is configured to store permissions data for one or more VPNs that may execute on the client computing device 112. Example VPN permissions may include permission to access a resource or data on the client computing device 112.

The VPN configuration data 128 is configured to store information about the configuration of one or more VPN client codes that may execute on the client computing device 112. The VPN configuration data 128 may include firewall settings or tunnel settings for the private networks, as well as an identifier of one or more VPN servers (e.g., VPN server 102) associated with a particular VPN.

The VPN broker module 130 is configured to receive a request for VPN client code executing within the VPN client sandbox or within the sandboxed VPN software 122 to access a resource (e.g., resource 132 or 134) within the memory region for secure software 124. The VPN broker module may determine whether the VPN client code has permission to access the local resource. The determination whether the VPN client code has permission to access the local resource may be based on user input or based on the VPN permissions data 126 or the VPN configuration data 128. If the VPN client code has permission to access the resource, the VPN broker module 130 may provide the resource to the VPN client code. If the VPN client code lacks permission to access the resource, the VPN broker module 130 may deny the local resource to the VPN client code and, optionally, provide an error message to the VPN client code.

The resources 132 or 134 may include one or more of a network packet tunnel from a kernel capable of receiving or sending packets to a restricted set of Internet Protocol (IP) addresses, an ability to receive network configuration information from an administrator, access to a certificate encryption or authentication module, or an ability to set domain name servers. The certificate encryption or authentication module may include a public key cryptography standard PKCS #11 smart card. The resources 132 or 134 may be stored within the memory region for secure software 124. While only two resources 132 and 134 are illustrated here, the subject technology may be implemented with any number of resources.

The computer system 100 may also include an VPN connection 136. The VPN connection 136 may allow network traffic from a private network, e.g., a private network including the VPN server 102, to be securely transmitted to the client computing device 112 over a public network, e.g., the Internet. The VPN connection 136 may include a tunnel formed between the client computing device 112 and the VPN server 102 via software stored on the client computing device 112 or on the VPN server 102. The VPN connection 136 may be secure and may bridge the client computing device 112 to a private network, e.g., a corporate intranet, via a public network, e.g., the Internet.

Figure 2:
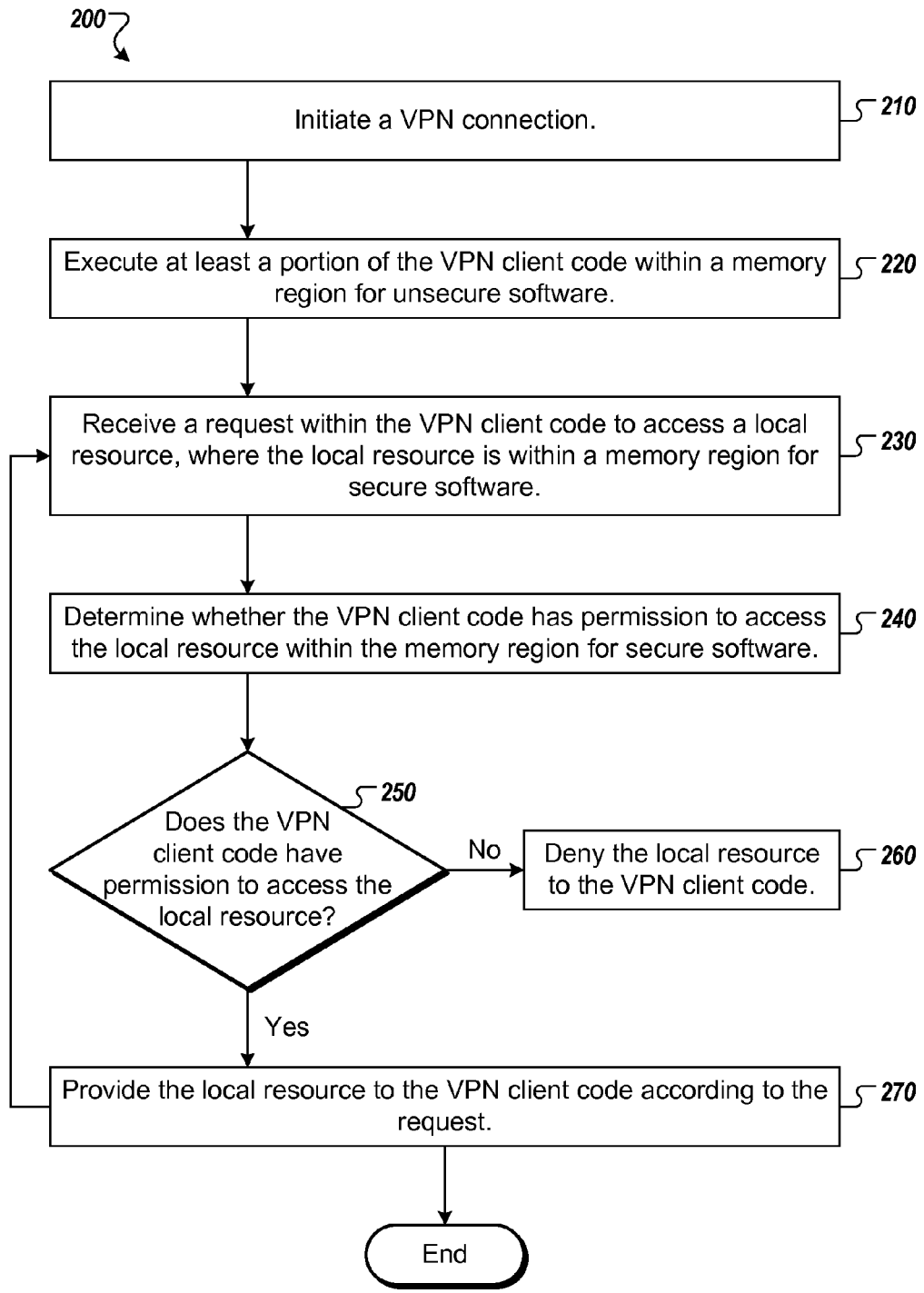
FIG. 2 illustrates an example process by which a client computing device may securely interact with a private network.

FIG. 2 illustrates an example process 200 by which a client computing device may securely interact with a virtual private network.

The process 200 begins at step 210, where the client computing device initiates a VPN connection, i.e., a connection into a private network over a public network. The VPN connection may be initiated with a VPN server.

According to step 220, the client computing device executes at least a portion of the VPN client code within a memory region for unsecure software. The portion of the VPN client code may be executed within a sandboxed VPN software region within the memory region for unsecure software. The sandboxed VPN software region may be configured to implement fault isolation via software, hardware, or a combination of software and hardware.

According to step 230, the client computing device receives a request within the VPN client code to access a local resource (e.g., resource 132 or 134). The local resource may be within a memory region for secure software of the client computing device. The memory region for secure software of the client computing device may be separate and distinct from the memory region for unsecure software of the client computing device. The local resource may include one or more of a network packet tunnel from a kernel capable of receiving and sending packets to a restricted set of Internet Protocol (IP) addresses, an ability to receive network configuration information from an administrator, access to a certificate encryption or authentication module, or an ability to set domain name servers. The certificate encryption or authentication module may include a public key cryptography standard PKCS #11 smart card.

According to step 240, the client computing device determines whether the VPN client code has permission to access the local resource within the memory region for secure software. In one implementation, the client computing device may determine whether the VPN client code has permission to access the local resource based on VPN permission data or VPN configuration data stored within the memory region for secure software. In an alternative implementation, the client computing device may determine whether the VPN client code has permission to access the local resource by prompting a user associated with the memory region for secure software (i.e., a user of the client computing device) for permission to access the local resource and receiving, from the user, an indication whether the VPN client code has permission to access the local resource. In one example, a window requesting permission to access the local resource may be displayed on a screen of the client computing device, and the user may click one button to permit the VPN client code to access the local resource or another button to deny the VPN client code access to the local resource.

According to step 250, the process 200 branches depending on whether the VPN client code has permission to access the local resource. If the VPN client code has permission to access the local resource, the process 200 continues to step 270. However, if the VPN client code lacks permission to access the local resource, the process 200 continues to step 260.

According to step 260, if the VPN client code lacks permission to access the local resource, the client computing device denies the local resource to the VPN client code. The client computing device may transmit an error message to the VPN client code. The error message may indicate that the VPN client code lacks permission to access the local resource. After step 260, the process 200 ends.

According to step 270, if the VPN client code has permission to access the local resource, the client computing device provides the local resource to the VPN client code according to the VPN client code. The local resource may be provided to the VPN client code, for example, via a remote procedure call (RPC) or via an application programming interface (API). If the VPN client code has permission to access the local resource, the instructions from the VPN client code that are executed by the client computing device may include native code. The native code may be configured to execute in conjunction with a processor on the client computing device. The native code may be configured to execute within a non-virtualized system, i.e., within a physical machine and not within a virtual machine. It should be noted that if the VPN client code lacks permission to access the local resource, the instructions from the VPN client code may still include native code. However, the client computing device may not execute the native code unless the native code may be executed within the VPN client sandbox. In one implementation, after step 270, the process 200 ends. In another implementation, after step 270, the client computing device receives a request within the VPN client code to access another local resource, where the other local resource is within the memory region for secure software, and the process 200 returns to step 230.

Figure 3:
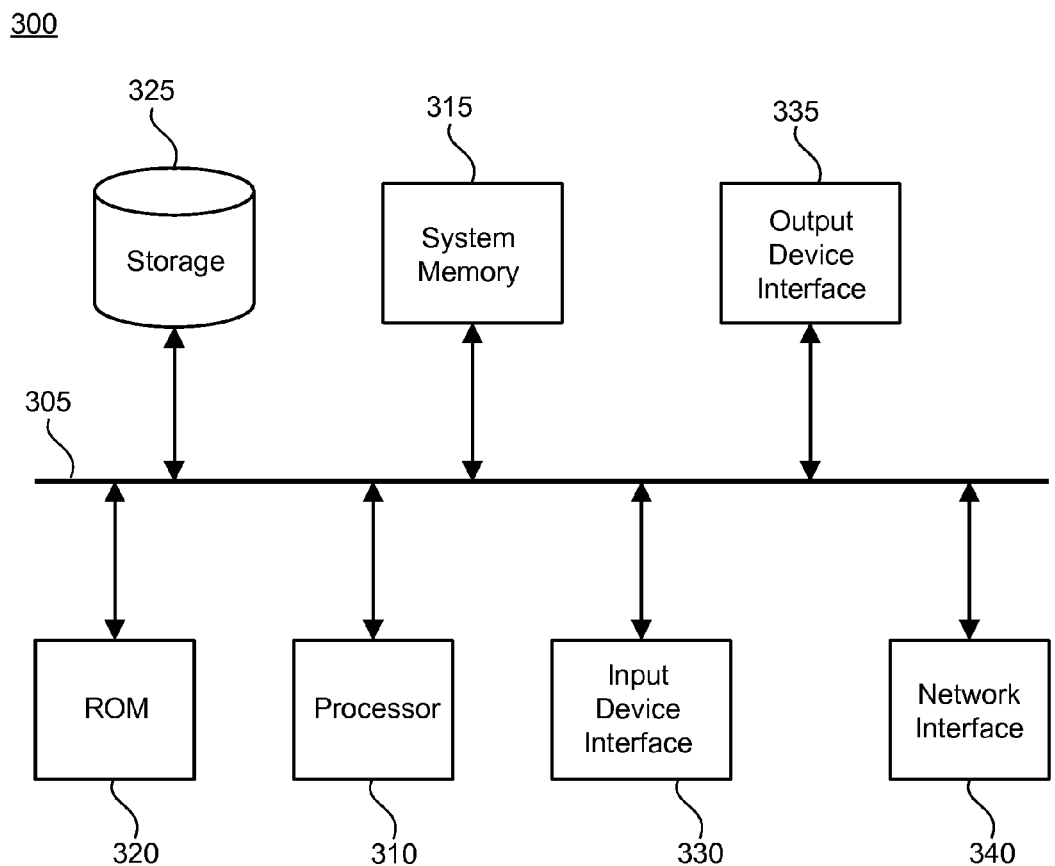
FIG. 3 conceptually illustrates an example electronic system with which some implementations of the subject technology are implemented.

FIG. 3 conceptually illustrates an electronic system 300 with which some implementations of the subject technology are implemented. For example, one or more of the VPN server 102 or the client computing device 112 may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the subject technology. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for allowing a client computing device to securely interact with a private network in accordance with some implementations. From these various memory units, the processing unit(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touchscreen that functions as both input and output devices.

Finally, as shown in FIG. 3, bus 305 also couples electronic system 300 to a network (not shown) through a network interface 340. In this manner, the electronic system 300 can be a part of a network of computers (for example a local area network ("LAN"), a wide area network ("WAN"), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase for example an "aspect" does not imply that the aspect is essential to the subject technology or that the aspect applies to all configurations of the subject technology. A disclosure relating to an aspect may apply to all configurations, or one or more configurations. A phrase for example an aspect may refer to one or more aspects and vice versa. A phrase for example a "configuration" does not imply that such configuration is essential to the subject technology or that such configuration applies to all configurations of the subject technology. A disclosure relating to a configuration may apply to all configurations, or one or more configurations. A phrase for example a configuration may refer to one or more configurations and vice versa.

What is claimed is:

1. A computer-implemented method for allowing a computing device to securely interact with a private network, the method comprising:

initiating, at the computing device, a virtual private network connection;

storing virtual private network permissions data and virtual private network configuration data within a memory region assigned to secure software at the computing device;

executing, by the computing device, at least a portion of a virtual private network client code within a memory region assigned to unsecure software on the computing device, wherein the memory region assigned to unsecure software is configured to implement fault isolation for the portion of the virtual private network client code, wherein the virtual private network client code is associated with the virtual private network connection;

receiving, at the computing device, a request within the virtual private network client code to access a local resource, wherein the local resource is stored within the memory region assigned to secure software on the computing device;

determining whether the virtual private network client code has permission to access the local resource within the memory region assigned to secure software, based on the virtual private network permissions data or the virtual private network configuration data stored within the memory region assigned to secure software;

if the virtual private network client code has permission to access the local resource, providing the local resource to the virtual private network client code according to the request within the virtual private network client code while the local resource remains at the computing device; and if the virtual private network client code lacks permission to access the local resource, denying access to the local resource to the virtual private network client code while the local resource remains at the computing device.

2. The method of claim 1, wherein the local resource comprises one or more of: a network packet tunnel from a kernel capable of receiving and sending packets to a restricted set of Internet Protocol (IP) addresses, an ability to receive network configuration information from an administrator, access to a certificate encryption or authentication module, or an ability to set domain name servers.

3. The method of claim 2, wherein the certificate encryption or authentication module comprises a public key cryptography standard PKCS #11 smart card.

4. The method of claim 1, wherein the memory region assigned to unsecure software comprises sandboxed virtual private network software.

5. The method of claim 1, wherein the virtual private network client code has permission to access the local resource, wherein the local resource is provided to the virtual private network client code via a remote procedure call.

6. The method of claim 1, wherein the virtual private network client code has permission to access the local resource, wherein the local resource is provided to the virtual private network client code via an application programming interface.

7. The method of claim 1, wherein the virtual private network client code lacks permission to access the local resource, the method further comprising transmitting an error message to the virtual private network client code, wherein the error message indicates that the virtual private network client code lacks permission to access the local resource.

8. The method of claim 1, wherein the determining whether the virtual private network client code has permission to access the local resource within the memory region assigned to secure software comprises:
prompting a user associated with the memory region assigned to secure software for permission to access the local resource; and
receiving, from the user, an indication whether the virtual private network client code has permission to access the local resource.

9. The method of claim 1, wherein the virtual private network client code comprises native code, wherein the native code is configured to execute in conjunction with a processor associated with the memory region assigned to unsecure software or the memory region assigned to secure software.

10. The method of claim 9, wherein the native code is configured to execute within a non-virtualized system.

11. A non-transitory computer-readable medium for allowing a computing device to securely interact with a private network, the computer-readable medium comprising instructions that, when executed by the computing device, cause the computing device to:
initiate, at the computing device, a virtual private network connection;
store virtual private network permissions data and virtual private network configuration data within a memory region assigned to secure software at the computing device;
execute by the computing device, at least a portion of a virtual private network client code within a memory region assigned to unsecure software on the computing device, wherein the memory region assigned to unsecure software is configured to implement fault isolation for the portion of the virtual private network client code, wherein the virtual private network client code is associated with the virtual private network connection;
receive a request from the virtual private network client code to access a local resource stored at the computing device within a memory region assigned to secure software;
determine whether the virtual private network client code has permission to access the local resource within the memory region assigned to secure software, based on the virtual private network permissions data or the virtual private network configuration data stored within the memory region assigned to secure software;
if the virtual private network client code has permission to access the local resource, provide the local resource to the virtual private network client code according to the request while the local resource remains at the computing device; and
if the virtual private network client code lacks permission to access the local resource, deny access to the local resource to the virtual private network client code while the local resource remains at the computing device.

12. The computer-readable medium of claim 11, wherein the local resource comprises one or more of: a network packet tunnel from a kernel capable of receiving and sending packets to a restricted set of Internet Protocol (IP) addresses, an ability to receive network configuration information from an administrator, access to a certificate encryption or authentication module, or an ability to set domain name servers.

13. The computer-readable medium of claim 12, wherein the certificate encryption or authentication module comprises a public key cryptography standard PKCS #11 smart card.

14. The computer-readable medium of claim 11, wherein the virtual private network client code has permission to access the local resource, wherein the local resource is provided to the virtual private network via a remote procedure call.

15. The computer-readable medium of claim 11, wherein the virtual private network client code has permission to access the local resource, wherein the local resource is provided to the virtual private network client code via an application programming interface.

16. The computer-readable medium of claim 11, wherein the virtual private network client code lacks permission to access the local resource, the method further comprising transmitting an error message to the virtual private network client code, wherein the error message indicates that the virtual private network client code lacks permission to access the local resource.

17. The computer-readable medium of claim 11, wherein the instructions to determine whether the virtual private network client code has permission to access the local resource within the memory region assigned to secure software comprise instructions that, when executed by a computer, cause the computer to:
prompt a user associated with the memory region assigned to secure software for permission to access the local resource; and
receive, from the user, an indication whether the virtual private network has permission to access the local resource.

18. The computer-readable medium of claim 11, wherein the request comprises native code, wherein the native code is configured to execute in conjunction with a processor associated with the memory region assigned to unsecure software or the memory region assigned to secure software.

19. The computer-readable medium of claim 18, wherein the native code is configured to execute within a non-virtualized system.

20. A system comprising:
a fault-isolated, sandboxed virtual private network software region within a memory region assigned to unsecure software of a computing device, wherein the fault-isolated, sandboxed virtual private network software region is configured to:
execute at least a portion of a virtual private network client code; and
a virtual private network broker module within a memory region assigned to secure software of the computing device, wherein the virtual private network broker module is configured to:
store virtual private network permissions data and virtual private network configuration data within a memory region assigned to secure software at the computing device,
receive a request within the virtual private network client code to access a local resource, wherein the local resource is stored at the computing device within the memory region assigned to secure software, determine whether the virtual private network client code has permission to access the local resource stored at the computing device within the memory region assigned to secure software, based on the virtual private network permissions data or the virtual private network configuration data stored within the memory region assigned to secure software, if the virtual private network client code has permission to access the local resource, provide the local resource to the virtual private network client code according to the request within the virtual private network client code while the local resource remains at the computing device, and if the virtual private network client code lacks permission to access the local resource, deny access to the local resource to the virtual private network client code while the local resource remains at the computing device.

21. The system of claim 20, wherein the memory region assigned to secure software is configured to execute code, wherein the code is associated with affirmative permission for the code to execute.

22. The system of claim 21, wherein the affirmative permission is provided by a user or stored within a module in the memory region assigned to secure software.

23. The system of claim 20, wherein the fault-isolated, sandboxed virtual private network software region comprises a web platform.

24. The system of claim 23, wherein the virtual private network client code comprises a high-level language code, wherein the virtual private network client code further comprises native code or low-level portable virtual machine code.

25. The system of claim 24, wherein the high-level language code comprises JavaScript code or HTML5 code.

26. The system of claim 25, wherein the virtual private network client code is implemented via an HTML5 web platform.

27. The system of claim 26, wherein the HTML5 web platform comprises at least one extension configured to interact with the virtual private network broker module.

28. The system of claim 23, wherein the virtual private network client code is downloaded to the fault-isolated, sandboxed virtual private network software region via a web protocol.

29. The system of claim 28, wherein the web protocol comprises HTTP or HTTPS.

30. The system of claim 28, wherein the virtual private network client code is written via a web application programming interface.

31. The system of claim 30, wherein the web application programming interface comprises JavaScript code, HTML code, or CSS code.

32. The method of claim 1, wherein determining whether the virtual private network client code has permission to access the local resource comprises:

determining, based user input obtained at the computing device, whether the virtual private network client code has permission to access the local resource.

33. The method of claim 1, wherein determining whether the virtual private network client code has permission to access the local resource comprises:

determining, at a broker module of the computing device, whether the virtual private network client code has permission to access the local resource, wherein the broker module is distinct from the virtual private network client code, and wherein the broker module executes within the memory region for assigned to secure software.

\* \* \* \* \*